(12) United States Patent
Penner et al.

(10) Patent No.: US 9,933,052 B2
(45) Date of Patent: Apr. 3, 2018

(54) CHAIN GUIDE ELEMENT

(71) Applicant: SCHAEFFLER TECHNOLOGIES AG & CO. KG, Herzogenaurach (DE)

(72) Inventors: Stephan Penner, Bühl (DE); Pierre Werny, Strasbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 129 days.

(21) Appl. No.: 15/024,951

(22) PCT Filed: Sep. 24, 2014

(86) PCT No.: PCT/DE2014/200503
§ 371 (c)(1),
(2) Date: Mar. 25, 2016

(87) PCT Pub. No.: WO2015/043598
PCT Pub. Date: Apr. 2, 2015

(65) Prior Publication Data
US 2016/0238111 A1   Aug. 18, 2016

(30) Foreign Application Priority Data
Sep. 26, 2013  (DE) .......... 10 2013 219 351

(51) Int. Cl.
*F16H 7/18*  (2006.01)
*F16H 9/24*  (2006.01)

(52) U.S. Cl.
CPC .............. *F16H 7/18* (2013.01); *F16H 9/24* (2013.01); *F16H 2007/185* (2013.01)

(58) Field of Classification Search
CPC ........ F16H 7/18; F16H 2007/185; F16H 7/20; F16H 59/36
See application file for complete search history.

(56) References Cited

U.S. PATENT DOCUMENTS

| | | | |
|---|---|---|---|
| 6,435,994 B1 * | 8/2002 | Friedmann | F16H 7/18 474/111 |
| 7,354,364 B2 * | 4/2008 | Glas | F16H 59/36 474/140 |
| 8,057,336 B2 * | 11/2011 | Wodtke | F16H 7/18 474/111 |
| 9,382,982 B2 * | 7/2016 | Werny | F16H 7/18 |

(Continued)

FOREIGN PATENT DOCUMENTS

| | | |
|---|---|---|
| CN | 101994800 A | 3/2011 |
| CN | 102027266 A | 4/2011 |

(Continued)

OTHER PUBLICATIONS

Chinese Office Action, Application 201480052962.X; 7 pgs; dated Jun. 1, 2017 by Chinese Patent Office.

*Primary Examiner* — William E Dondero
*Assistant Examiner* — Robert T Reese
(74) *Attorney, Agent, or Firm* — LeKeisha M. Suggs

(57) ABSTRACT

A chain guide element having a pair of guide rails spaced from each other to guide a moving chain therebetween. A coupling element extends from one guide rail for receiving a transversely arranged holding element for allowing pivotal movement of the chain guide element relative to the holding element. A securing element is carried by the holding element for engagement with the coupling element.

9 Claims, 2 Drawing Sheets

(56) References Cited

U.S. PATENT DOCUMENTS

| | | | | |
|---|---|---|---|---|
| 9,458,916 B2* | 10/2016 | Garcia | ............... | F16H 7/18 |
| 2005/0277500 A1 | 12/2005 | Bitzer et al. | | |
| 2011/0034278 A1* | 2/2011 | Inoue | ............... | F16H 9/24 |
| | | | | 474/8 |
| 2011/0244999 A1* | 10/2011 | Nakamura | ............... | F16H 9/18 |
| | | | | 474/91 |
| 2014/0235390 A1* | 8/2014 | Urbanek | ............... | F16H 7/18 |
| | | | | 474/140 |
| 2016/0208891 A1* | 7/2016 | Werny | ............... | F16H 7/18 |
| 2016/0215861 A1* | 7/2016 | Kato | ............... | F16H 7/20 |

FOREIGN PATENT DOCUMENTS

| | | |
|---|---|---|
| CN | 102207178 A | 10/2011 |
| CN | 102213303 A | 10/2011 |
| DE | 102 03 941 A1 | 8/2002 |
| DE | 10 2012 219 366 A1 | 5/2013 |
| EP | 2 282 081 A1 | 2/2011 |
| EP | 1499900 A2 | 3/2011 |
| EP | 2 372 189 A1 | 10/2011 |
| NL | 1014872 A1 | 3/2011 |
| WO | WO 03/087846 A2 | 10/2003 |

\* cited by examiner

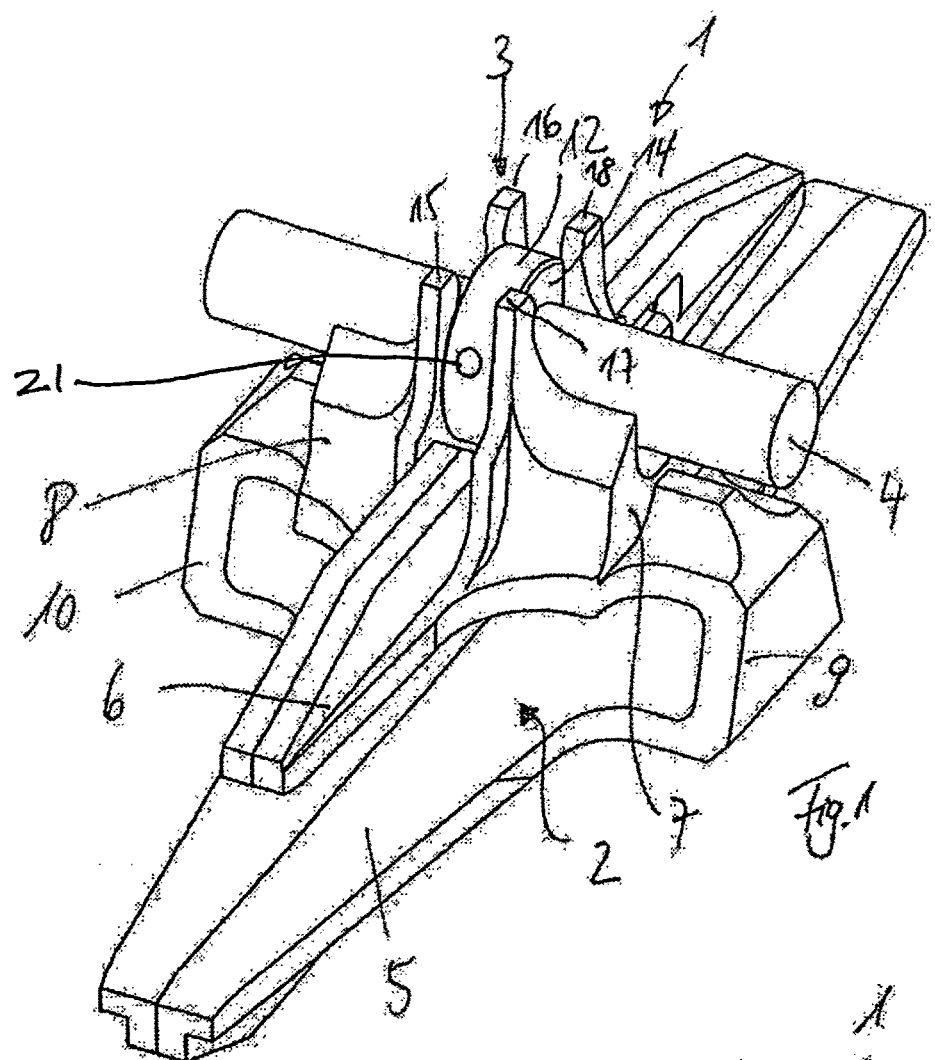
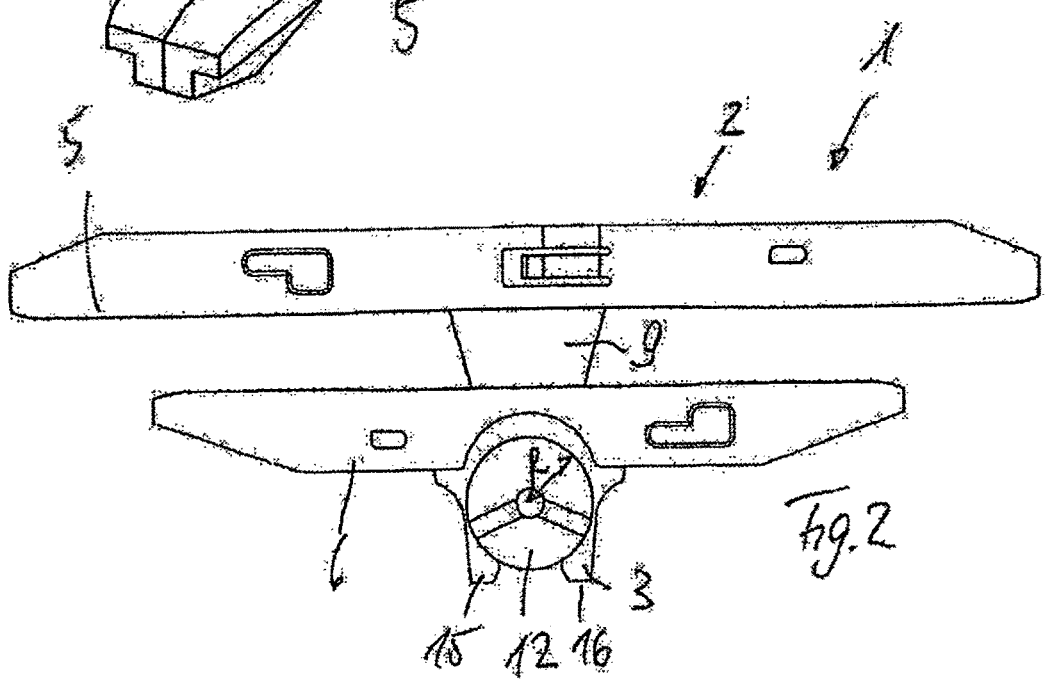

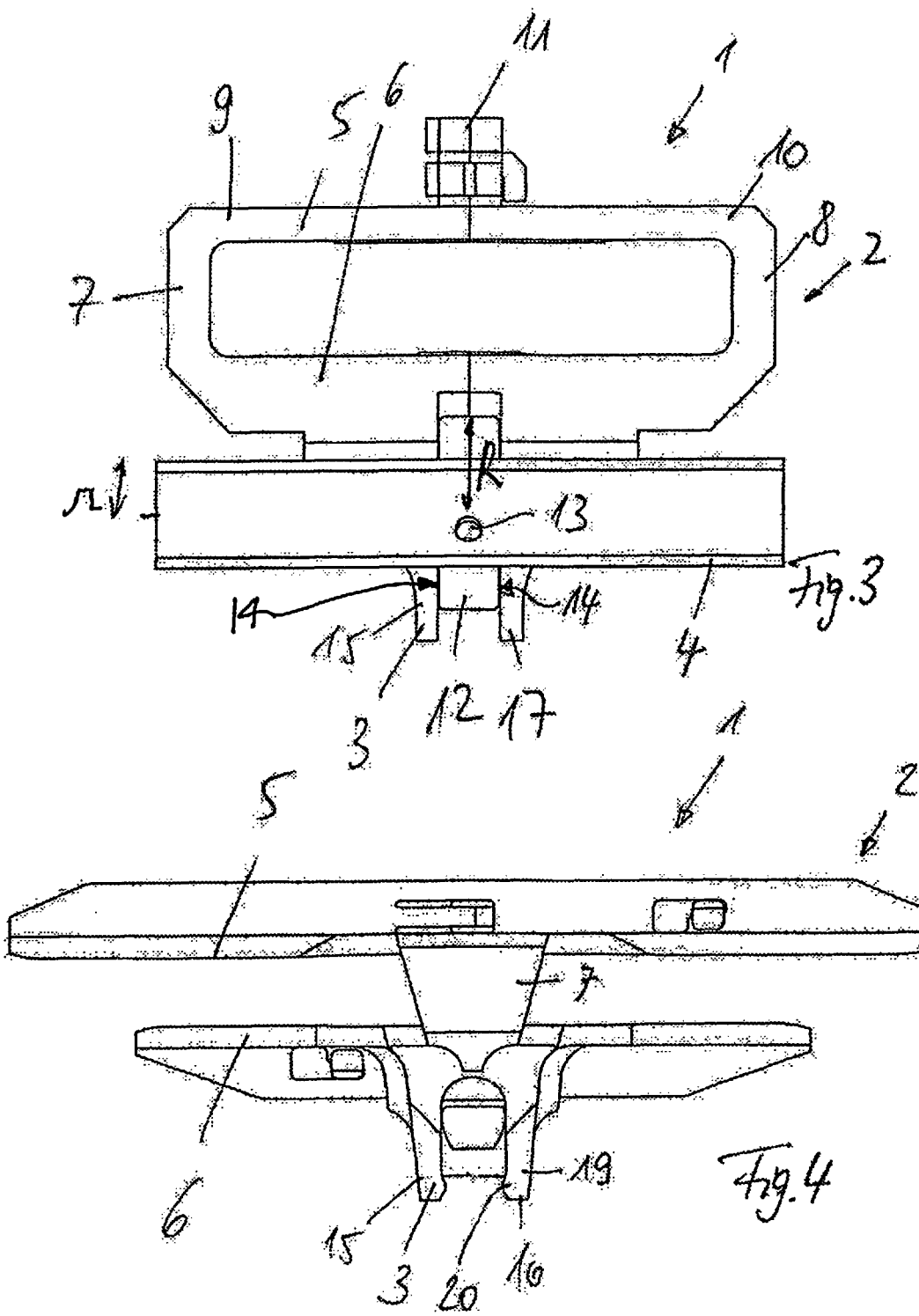

CHAIN GUIDE ELEMENT

CROSS-REFERENCE TO RELATED APPLICATION

This application is the U.S. national phase application under 35 U.S.C. § 371 of International Application Serial No. PCT/DE2014/200503, having an international filing date of 24 Sep. 2014, and designating the United States, which claims priority based upon German Patent Application No. DE 10 2013 219 351.3, filed on 26 Sep. 2013, the entire contents of each of which applications are hereby incorporated by reference herein to the same extent as if fully rewritten.

BACKGROUND OF THE INVENTION

Field of the Invention

The present invention relates to a chain guide element, in particular for a CVT transmission of a motor vehicle.

Description of the Related Art

Chain guide elements are known in CVT transmissions according to the prior art, to guide the chain and to damp strand vibrations of the chain. Accordingly, DE 102 03 941 A1 discloses a continuously variable, chain-driven, conical-pulley transmission as a CVT transmission in which opposing chain guide elements are employed in order to guide the chain and to damp chain strand vibrations. In that case, the two chain guides are coupled by means of a coupling mechanism, where the coupling mechanism permits adjustment of the wrapping and thus adjustment of the path of the chain, and allows adjustment of the chain guide elements. In the disclosed coupling, the chain is in contact with the guide element for only part of the total operating time, which can result in vibrations of the unguided chain strand and thus in increased wear and unwanted noise.

An object of the invention is to provide a chain guide element by means of which improved damping of a chain strand is achievable, and which is nevertheless simply and economically constructed.

SUMMARY OF THE INVENTION

An exemplary embodiment of the present invention provides a chain guide element having a guide rail to contact and guide a chain, and having a coupling element which has a receptacle for a holding element. The holding element is designed as a cylindrical element having a securing element which is received by the coupling element. By means of the securing element, which is received by the coupling element, swiveling of the chain guide element perpendicular to the direction of the axis of the holding element is reduced or even prevented.

It is especially advantageous if the coupling element is formed by means of two pairs of tongues, where each of the tongues that form a pair receive the holding element between them, and the securing element is received between the two pairs of tongues. In that case, the tongues of one pair grasp the holding element and the tongues of one pair then lie on one side of the securing element in such a way that the tongues of the two different pairs are each situated on a different side of the securing element.

It is especially advantageous if the guide rail has at least one essentially flat plate extending laterally and which is impinging on the chain. That at least one flat plate serves to guide the chain and reduce strand vibrations, because when the chain is in contact with the plate, vibration is reduced as the degree of freedom of movement of the chain is reduced. If two spaced plates are provided, then the chain can be guided between those plates, which reduces the strand vibrations.

It is especially advantageous if the tongues extend down from the plate. In that case, it is advantageous if the tongues extend approximately vertically from the plate, and thus form a receptacle to receive the holding element having the securing element. If the tongues are of flexible design, then the holding element can be pushed up between the tongues and clipped in.

It is especially advantageous then if the tongues are oriented essentially parallel to each other.

It is also useful if the tongues have thickenings in their end regions, which are directed toward each other in adjacent tongues of a pair. In that way a type of undercutting can be achieved for clipping the holding element.

It is also advantageous if the securing element is a cylinder or a non-round element of uniform thickness, which receives the cylindrical holding element. The cylinder or non-round, uniformly thick element in that case can have a drilled hole which receives the cylindrical or tubular holding element. A non-round, uniformly thick element in that case is a non-round element which, however, has the same diameter at every angle of rotation.

It is especially advantageous if a cylindrical holding element is a tube which serves to deliver lubricant.

It is also advantageous here if the cylinder is provided with at least one hole which is aligned with a hole in the tube, to serve to deliver lubricating oil to the chain. Accordingly, the cylinder with its at least one hole, and preferably two holes, is placed on the holding element in the form of a tube, which in turn has at least one hole from which lubricating oil can issue, which is then conducted to the cylinder and issues from there.

In this case, it is advantageous if the guide rail has two spaced plates and two adjacent walls opposite each other, which connect the two plates at their edges and so make a channel to receive the chain. That provides reliable and defined guidance of the chain.

BRIEF DESCRIPTION OF THE DRAWINGS

The present invention will be explained in greater detail below on the basis of preferred exemplary embodiments, in combination with the corresponding figures.

The figures show the following:

FIG. 1 is a schematic view from below a chain of a chain guide element with a holding element and a securing element in perspective view, FIG. 2 is a side view of one-half of a chain guide element with a holding element and a securing element, FIG. 3 is a cross-sectional view of a chain guide element with a holding element and a securing element, and FIG. 4 is a side view of the chain guide element.

DESCRIPTION OF THE PREFERRED EMBODIMENTS

FIGS. 1 through 4 show a chain guide element 1 for a chain, in particular for a chain-driven, conical-pulley transmission, and in various views. The chain guide element 1 has a guide rail 2 which extends longitudinally, and a coupling element 3. The coupling element 3 serves to receive a holding element 4 for coupling the guide rail 2 with the holding element 4.

By means of the holding element 4, the guide rail 2 of the chain guide element 1 is held, for example in a transmission housing.

In that case, the chain guide element 1 includes a guide rail 2 which includes a first plate 5 and a second plate 6, which are connected on their lateral sides by two walls 7, 8 spaced from each other, in order to form a channel through which a chain can be guided. The plates 5, 6 have a lateral extent that corresponds to the running direction of the chain, so that the plates 5, 6 are able to contact the chain over a portion of their extent and thus reduce strand vibrations.

The plates 5, 6 are divided in two in their longitudinal direction, with each half side of plate 5 and plate 6 being connected to a wall 7, 8 and forming a sort of half shell 9,10. The two half shells 9,10 formed in this way are joined to each other using connecting means 11. The connecting means can be snap-on means. Alternatively, the half shells can also be bonded or welded to each other or joined in some other way.

The holding element 4 is a cylindrical element, which has, for example, the form of a tube and can be located in a transmission housing. For example, the holding element 4 can also be a tube of the lubricating oil supply system for the chain. In that case, the holding element 4 can have an opening 13 in the area of the chain guide element for the release of lubricating oil in order to lubricate the chain.

Connected to the holding element 4 is a securing element 12, which is in the form of a cylinder. The cylinder 12 is pushed over the cylindrical, or non-round, uniformly thick holding element 4 and is preferably joined to the holding element 4 positively, either frictionally or by material bonding. The securing element 12 has a radius R which is greater than the radius r of the holding element 4, so that the securing element 12 extends radially beyond the holding element 4 and has spaced lateral surfaces 14 for engagement with the coupling element 3.

The coupling element 3 has four tongues 15, 16, 17, and 18, which are arranged in pairs and extend downwardly from the second plate 6. The tongues are oriented essentially parallel to each other. A pair of tongues is assigned to a respective half shell 9, 10. The tongues 15, 16 or 17, 18 of a pair engage the holding element 4 on opposite sides and receive it between them. So that the holding element 4 does not release from the tongues, tongue pairs 15, 16 and 17, 18 each include opposed, inwardly-facing enlargements 20 at their respective inner distal end regions 19. The opposed, inwardly-facing enlargements of the tongues thereby become a sort of snap connection, and the holding element 4 can only come out of the engagement region of the opposed tongues by the application of a withdrawal force. The opposed, inwardly-facing enlargements 20 of a pair of tongues 15, 16 and 17, 18 are directed toward each other.

The tongues 15 through 18 are positioned so that the spacing of laterally adjacent pairs of tongues of the coupling element 3 is approximately the distance of the axial extent of the securing element 12, so that the tongues preferably rest laterally against the sides of the securing element 12 and against respective ones of the side surfaces 14. That arrangement limits or prevents movement of the chain guide element 1 axially along the holding element 4, or transversely relative to the longitudinal axis of the holding element 4.

The securing element 12 has at least one channel or one opening 21, which is aligned with opening 13 in the holding element in order to effect a delivery of lubricating oil.

The invention claimed is:

1. A chain guide element comprising:
  a pair of guide rails to contact and to guide a moving chain,
  a coupling element carried by the chain guide element and extending from a downwardly-facing surface of the guide rails and defining a receptacle,
  a cylindrical holding element that carries a securing element that is received by the coupling element,
  wherein the cylindrical holding element and securing element engage the coupling element for guiding the chain and to damp chain strand vibrations, wherein the coupling element includes two spaced pairs of tongues, wherein a respective pair of tongues is adjacent a respective lateral side of the securing element for receiving the cylindrical holding element between the spaced pairs of tongues, and wherein the securing element is received between the two spaced pairs of tongues.

2. A chain guide element according to claim 1, wherein the guide rail includes a pair of flat plates that extend laterally above and below respective upper and lower sides of the chain, and which contact respective upper and lower sides of the chain.

3. A chain guide element according to claim 2, wherein the pairs of tongues extend downwardly from the plate that contacts the lower side of the chain.

4. A chain guide element according to claim 3, wherein the pairs of tongues are oriented to extend parallel to each other.

5. A chain guide element according to claim 2, wherein the plates are spaced from each other and include respective opposed end walls that connect the plates at their edges to define a channel to receive the chain.

6. A chain guide element according to claim 1, wherein the respective pairs of tongues include opposed enlargements that face respective sides of the securing element at end regions of the tongues, which enlargements of pairs of tongues on one side of the securing element are oriented toward corresponding enlargements at end regions of an opposed pair of tongues on an opposite side of the securing element.

7. A chain guide element according to claim 1, wherein the securing element is a cylinder that receives the cylindrical holding element.

8. A chain guide element according to claim 1, wherein the cylindrical holding element is a tube that serves to deliver lubricating oil to the chain.

9. A chain guide element according to claim 8, wherein the securing element includes at least one hole aligned with the hole in the cylindrical holding element.

\* \* \* \* \*